(12) United States Patent
Fuller et al.

(10) Patent No.: US 11,163,096 B2
(45) Date of Patent: Nov. 2, 2021

(54) LENS SYSTEM WITH OPTICAL ACTUATOR

(71) Applicant: Apple Inc., Cupertino, CA (US)

(72) Inventors: Paul Christian Thomas Fuller, Lyons (FR); Iain A. McAllister, Campbell, CA (US); Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 16/323,769

(22) PCT Filed: Aug. 8, 2017

(86) PCT No.: PCT/US2017/045978
§ 371 (c)(1),
(2) Date: Feb. 6, 2019

(87) PCT Pub. No.: WO2018/031590
PCT Pub. Date: Feb. 15, 2018

(65) Prior Publication Data
US 2019/0170914 A1 Jun. 6, 2019

Related U.S. Application Data

(60) Provisional application No. 62/372,690, filed on Aug. 9, 2016.

(51) Int. Cl.
*G02B 3/12* (2006.01)
*G02B 3/14* (2006.01)
(Continued)

(52) U.S. Cl.
CPC .................. *G02B 3/14* (2013.01); *G02B 7/08* (2013.01); *G02B 7/09* (2013.01); *G02B 26/0875* (2013.01);
(Continued)

(58) Field of Classification Search
CPC ... G02B 3/14; G02B 7/08; G02B 7/09; G02B 26/0875; G02B 27/005; G02B 27/646; H04N 5/2254; H04N 5/23212
(Continued)

(56) References Cited

U.S. PATENT DOCUMENTS 7,359,124 B1 4/2008 Fan et al.
7,672,059 B2 3/2010 Batchko et al.
(Continued)

FOREIGN PATENT DOCUMENTS

CN 1914522 2/2007
CN 101180581 5/2008
(Continued)

OTHER PUBLICATIONS

Office action from Chinese Application No. 201780047827, dated May 15, 2020, (English Translation and Chinese version), pp. 1-30.

*Primary Examiner* — William Choi
(74) *Attorney, Agent, or Firm* — Robert C. Kowert; Kowert, Hood, Munyon, Rankin & Goetzel, P.C.

(57) ABSTRACT

Compact lens systems that may be used in small form factor cameras. The lens system may include a master lens with two or more lens elements arranged along an optical axis and having refractive power, and an optical actuator located on the object side of the master lens that may provide autofocus (AF) and/or optical image stabilization (OIS) functionality for the camera. An aperture stop for the camera may be included in the optical actuator, for example between a substrate and a flexible optical element of the optical actuator. Including the aperture stop in the optical actuator rather than in the lens stack may allow the optical actuator to be smaller in the X-Y dimensions (perpendicular to the optical (Z) axis) than it would be in a similar camera with the aperture stop located in the lens stack.

20 Claims, 11 Drawing Sheets

(51) Int. Cl.
*G02B 26/08* (2006.01)
*G02B 7/08* (2021.01)
*H04N 5/225* (2006.01)
*G02B 7/09* (2021.01)
*H04N 5/232* (2006.01)
*G02B 27/00* (2006.01)
*G02B 27/64* (2006.01)

(52) U.S. Cl.
CPC ........ *H04N 5/2254* (2013.01); *H04N 5/23212* (2013.01); *G02B 27/005* (2013.01); *G02B 27/646* (2013.01)

(58) Field of Classification Search
USPC ......................................................... 359/666
See application file for complete search history.

(56) References Cited

U.S. PATENT DOCUMENTS

| | | |
|---|---|---|
| 7,768,713 B2 | 8/2010 | Yu et al. |
| 7,986,466 B2 | 7/2011 | Lee et al. |
| 8,659,835 B2 | 2/2014 | Bueler et al. |
| 2008/0170217 A1 | 7/2008 | Dodoc et al. |
| 2008/0225403 A1 | 9/2008 | Weekamp et al. |
| 2008/0231966 A1 | 9/2008 | Hendriks et al. |
| 2010/0284091 A1 | 11/2010 | Okamoto |
| 2014/0028905 A1 | 1/2014 | Kim |
| 2015/0028195 A1 | 1/2015 | King et al. |
| 2016/0124220 A1 | 5/2016 | Bueeler et al. |
| 2016/0202455 A1 | 7/2016 | Aschwanden et al. |

FOREIGN PATENT DOCUMENTS

| | | |
|---|---|---|
| CN | 101910904 | 12/2010 |
| CN | 103576417 | 2/2014 |
| CN | 105637403 | 6/2016 |
| EP | 2239611 | 10/2010 |
| EP | 2693265 | 2/2014 |
| KR | 100835108 | 6/2008 |
| KR | 100835108 B1 * | 6/2008 |

\* cited by examiner

LENS SYSTEM WITH OPTICAL ACTUATOR

This application is a 371 of PCT Application No. PCT/US2017/045978, filed Aug. 8, 2017, which claims benefit of priority to U.S. Provisional Patent Application No. 62/372,690, filed Aug. 9, 2016. The above applications are incorporated herein by reference. To the extent that any material in the incorporated application conflicts with material expressly set forth herein, the material expressly set forth herein controls.

BACKGROUND

Technical Field

This disclosure relates generally to camera lens systems, and more specifically to high-resolution, small form factor camera systems and lens systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

Some small form factor cameras may incorporate an autofocus (AF) mechanism whereby the object focal distance can be adjusted to focus an object plane or field in front of the camera at an image plane to be captured by an image sensor (also referred to herein as a photosensor). In some such autofocus mechanisms, the optical lens is moved as a single rigid body along the optical axis (referred to as the Z axis) of the camera to refocus the camera. In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation or disturbance by adjusting location of the optical lens on the X and/or Y axis in an attempt to compensate for unwanted motion of the lens.

SUMMARY OF EMBODIMENTS

Embodiments of the present disclosure may provide a camera in a small package size, referred to as a small format factor camera. A small format factor camera is described that includes a photosensor and a compact lens system. Embodiments of the compact lens system include an optical actuator element, for example an optical microelectromechanical system (MEMS), and one or more refractive lens elements, referred to as a lens stack or master lens. The optical actuator may be located on the object side of the lens stack in front of a first lens of the stack, while the photosensor is located on the image side of the lens stack. The optical actuator may include, but is not limited to, a substrate at least partially composed of a clear material or substance (e.g., a clear glass or plastic substrate), a flexible optical element (e.g., a flexible lens), and an actuator component that is configured to change the shape of the flexible optical element to provide adaptive optical functionality for the camera. The optical functionality provided by the optical actuator may include autofocus (AF) functionality and/or optical image stabilization (OIS) functionality, for example. The optical actuator may also be referred to as an SSAF (Solid-State Auto-Focus) and/or SSOIS (Solid-State Optical Image Stabilization) component or module. By using SSAF and/or SSOIS technology to provide AF and/or OIS functionality in small form factor cameras as described herein, there is no longer a requirement to physically move the lens barrel with respect to the photosensor to achieve AF and/or OIS functionality. This has a significant impact on the X-Y size of the camera system by reducing the size of the camera in the X-Y dimensions.

In embodiments, an aperture stop for the camera may be included in the optical actuator, for example between the substrate and the flexible optical element of the optical actuator. Including the aperture stop in the optical actuator rather than in the lens stack may allow the optical actuator to be smaller in the X-Y dimensions (perpendicular to the optical (Z) axis) than it would be in a similar camera with the aperture stop located in the lens stack. For example, the optical actuator may be 20-30% smaller. This may allow the X-Y dimensions of the camera to be reduced when compared to a similar camera with the aperture stop located in the lens stack, and may also allow the X-Y dimensions of a cover window for the camera to be reduced. In addition, the smaller optical actuator may be less expensive to manufacture. Shapes, spacing, and/or sizes of the lens elements in the lens stack may be selected to account for the location of the aperture stop in front of the lens stack in the optical actuator, and for the size of the entrance pupil of the aperture stop. For example, the X-Y dimensions of one or more of the lens elements in the lens stack (e.g., the first three lens elements from the object side of the camera) may be increased according to the location and size of the aperture stop in the optical actuator so that the light rays passing through the aperture stop are correctly refracted through the lens elements in the lens stack to form an image at an image plane on the photosensor. The lens elements in the lens stack may be selected and arranged such that mechanical vignetting of the lens system is reduced or eliminated.

Figure 1A:
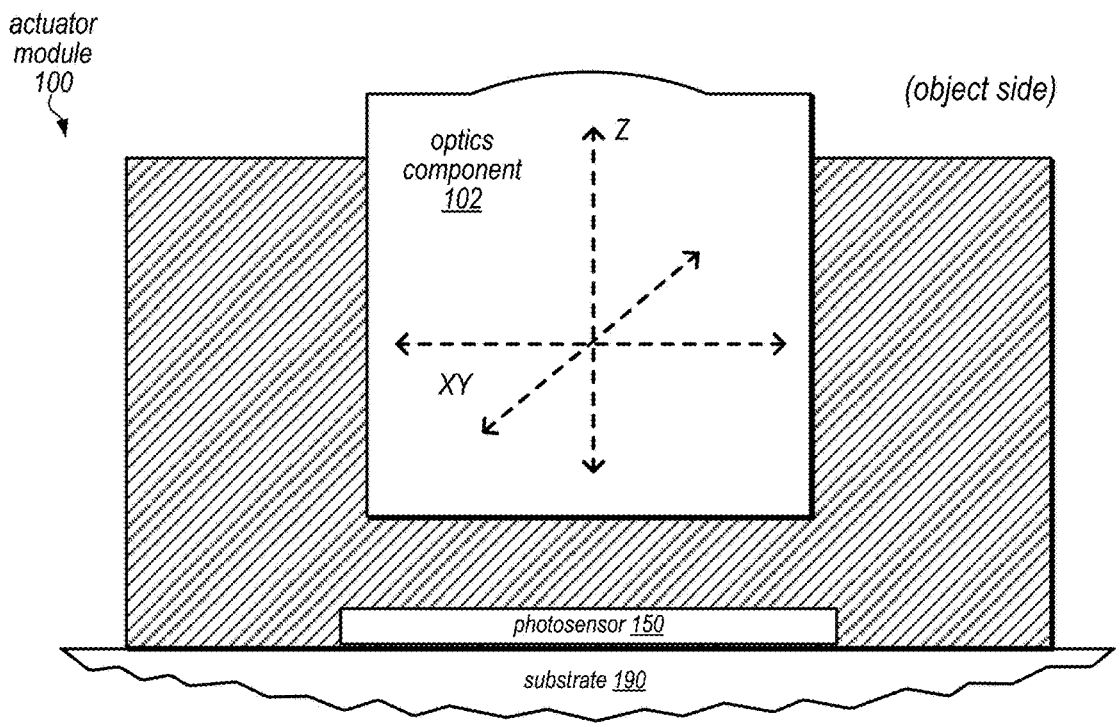
FIGS. 1A and 1B illustrate motion of an optics component within an example actuator module that provides mechanical autofocus (AF) and/or optical image stabilization (OIS) functionality for a camera.

This specification includes references to "one embodiment" or "an embodiment."The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact lens system, which may also be referred to as a lens module, are described that may include an optical actuator, for example an optical microelectromechanical system (MEMS), and one or more refractive lens elements, referred to as a lens stack, lens barrel, or master lens. Embodiments of the compact lens system may be used in cameras with a small package size, referred to as small format factor cameras. Embodiments of small format factor cameras are described that include, but are not limited to, a photosensor and embodiments of the compact lens system.

In embodiments of the compact lens system, an optical actuator may be located on the object side of the lens stack in front of a first lens of the stack, while the photosensor is located on the image side of the lens stack. The optical actuator may include, but is not limited to, a substrate (e.g., a clear glass or plastic substrate), a flexible optical element (e.g., a flexible lens), and an actuator component that is configured to dynamically change the shape of the flexible optical element to provide adaptive optical functionality for the camera. The optical functionality provided by the optical actuator may include autofocus (AF) functionality and/or optical image stabilization (OIS) functionality, for example. The optical actuator may also be referred to as an SSAF (Solid-State Auto-Focus) and/or SSOIS (Solid-State Optical Image Stabilization) component or module. While embodiments are generally described in which the optical actuator provide AF and/or OIS functionality for the camera, other optical functionalities, such as zoom functionality, may be provided by the optical actuator in some embodiments.

Figure 1B:
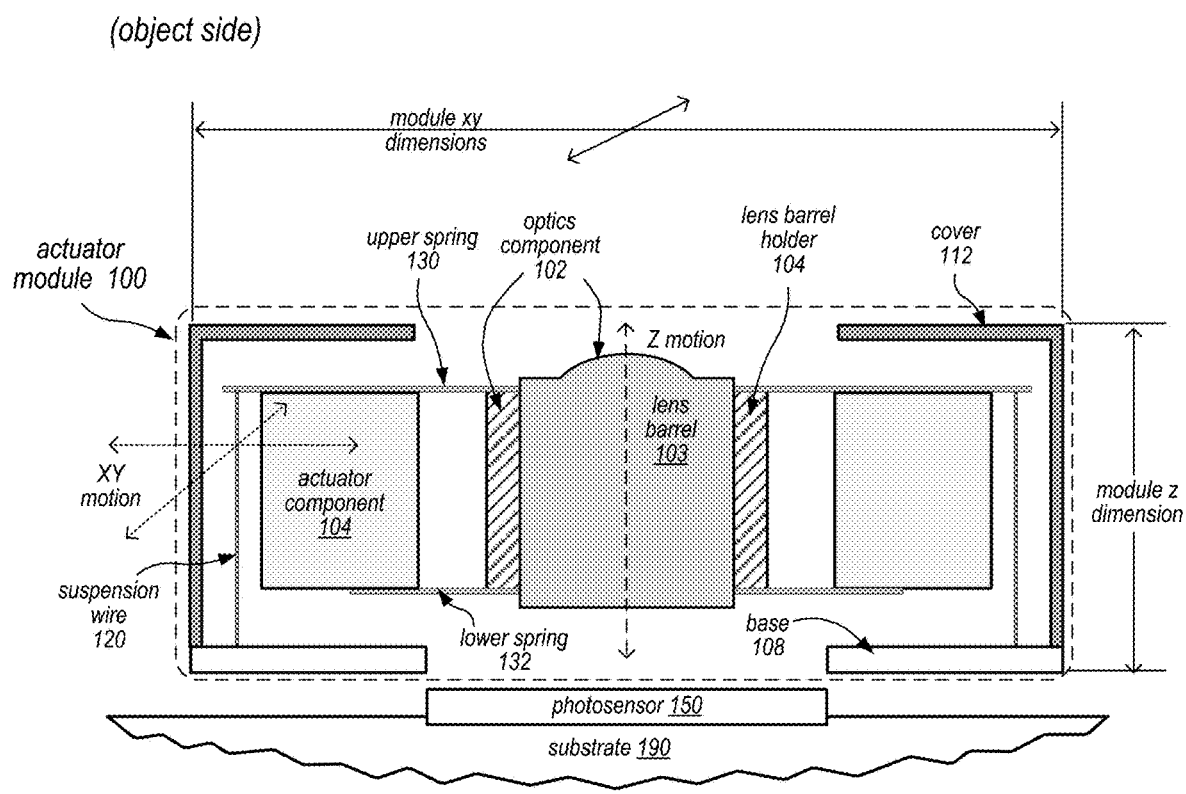

Typically, to achieve AF and/or OIS functionality in small form factor cameras, mechanical solutions, such as VCM (voice coil motor) technology that moves the lens module in relation to the image plane in the Z (optical axis) direction for AF and either by tilting or displacing the lens module in the X and Y (perpendicular to the Z axis) directions for OIS, have been used, for example as illustrated in FIGS. 1A and 1B. These mechanical solutions require that the lens barrel be assembled into a holder, and the overall system X-Y size is thus defined by the size of the holder. Thus, the system has an X-Y size that is defined by the holder X-Y size, the holder size is defined by the lens barrel X-Y size, which in turn is defined by the lens element X-Y sizes. This makes for a relatively large X-Y footprint for the camera. By using SSAF and/or SSOIS technology to provide AF and/or OIS functionality in the small form factor cameras described herein, there is no longer a requirement to move the lens barrel with respect to the image plane. The lens barrel can be fixed directly to the photosensor and therefore the holder is redundant and is removed. This has a significant impact on the X-Y size of the camera system by reducing the size of the camera in the X-Y dimensions.

The addition of the optical actuator that provides SSAF and/or SSOIS functionality to the lens barrel may increase the Z dimension of the lens assembly. However, as the displacement of the lens barrel is no longer required to achieve AF functionality, a much smaller nominal distance between the lens barrel and the camera system cover window can be achieved in embodiments. This offsets the majority or all of the net increase in the Z dimension due to the addition of the optical actuator.

In conventional cameras, an aperture stop for the camera may be included in the lens stack, for example at the first lens element in the stack. In at least some embodiments of the compact lens system as described herein, rather than including an aperture stop in the lens stack, for example at the first lens element in the stack, an aperture stop may be included in the optical actuator, for example between the substrate and the flexible optical element of the optical actuator. Including the aperture stop in the optical actuator rather than in the lens stack may allow the optical actuator to be smaller in the X-Y dimensions (perpendicular to the optical (Z) axis) than it would be in a similar camera with the aperture stop located in the lens stack. For example, the optical actuator may be 20-30% smaller. This may allow the X-Y dimensions of the camera to be reduced when compared to a similar camera with the aperture stop located in the lens stack, and may also allow the X-Y dimensions of a cover window for the camera to be reduced. In addition, the smaller optical actuator may be less expensive to manufacture.

Shapes, spacing, and/or sizes of the lens elements in the master lens may be selected to account for the location of the aperture stop in front of the lens stack in the optical actuator. For example, the X-Y dimensions of one or more of the lens elements in the master lens (e.g., the first three lens elements on the object size of the master lens) may be increased according to the location of the aperture stop in the optical actuator so that the light rays passing through the aperture stop are correctly refracted through the lens elements in the lens stack to form an image at an image plane on or proximate to the photosensor. The lens elements in the lens stack may be selected and arranged such that mechanical vignetting is reduced or eliminated in embodiments of the camera in which the aperture stop is included in the optical actuator. While it would be possible to maintain the aperture stop at the first lens element of the master lens and to add a field stop in the optical actuator, this arrangement may significantly affect the relative illumination of the system due to mechanical vignetting.

Embodiments of the small format factor camera as described herein may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications. In some embodiments, a camera as described herein may be included in a device along with one or more other cameras such as a wider-field small format camera or a telephoto or narrow angle small format camera, which would for example allow the user to select between the different camera formats (e.g., normal, telephoto or wide-field) when capturing images with the device. In some embodiments, two or more small format cameras as described herein may be included in a device, for example as front-facing and rear-facing cameras in a mobile device.

Typically, to achieve AF and/or OIS functionality in small form factor cameras, mechanical solutions, such as VCM (voice coil motor) technology that moves the lens module in relation to the image plane in the Z (optical axis) direction for AF and either by tilting or displacing the lens module in the X and Y (perpendicular to the Z axis) directions for OIS, have been used. FIGS. 1A and 1B illustrate motion of an optics component 102 within an example actuator module 100 that provides mechanical autofocus (AF) and/or optical image stabilization (OIS) functionality for a camera. The actuator module 100 may, for example, include a VCM actuator mechanism. The actuator module 100 may, for example, be mounted to a substrate 190 that includes a photosensor 150 of the camera. The actuator module 100 may provide motion to optics component 102 on the Z (optical) axis and/or in the XY plane. The XY plane motion may, for example, provide optical image stabilization (OIS) by moving the optics component 102 on the X and/or Y axis relative to the photosensor 150. The Z axis motion may, for example, provide optical focusing or autofocus for the camera by moving the optics component 102 on the Z axis relative to the photosensor 150.

FIG. 1B illustrates components of an example actuator module 100 that provides X, Y and Z motions for an optics component. In this example, the actuator module 100 may include an optics component 102 that is coupled to an actuator component 104 by upper and/or lower springs 130 and 132. The optics component 102 may include a lens barrel 103 that includes a stack of lens elements and a lens barrel holder 104. The object side of the optics component 102 may be oriented to the top or upper side or surface of the actuator module 100, while the image side of the optics component 102 may be oriented the bottom or lower side or surface of the actuator module 100. The actuator component 104 may, for example, include magnets used in a VCM actuator mechanism. The springs 130 and 132 may be flexible to allow motion of the optics component 102 on the Z axis relative to the actuator component 104 and photosensor 150. The actuator component 104 may be configured to move the optics component 102 and thus the lens barrel 103 on the Z axis within the actuator module 100 and relative to the photosensor 150 to provide focusing or autofocus for the camera. An assembly which includes at least the optics component 102, actuator component 104, and springs 130 and 132 may be suspended within the actuator module 100 on two or more suspension wires 120. For example, the suspension wires 120 may be mounted to base 108, and the assembly may be suspended on the wires 120 at the outer portion of the upper springs 130. The suspension wires 120 may be flexible to allow motion of the assembly, and thus of the optics component 102, on the XY axes orthogonal to the Z (optical) axis of the optics component 102. The actuator component 102 may be configured to move the optics component 102 and thus the lens barrel 103 on the XY axes within the actuator module 100 and relative to the photosensor 150 to provide optical image stabilization (OIS) for the camera. A cover 112 for the assembly may be attached to the base 108 of the actuator module 110. The assembled actuator module 100 may, for example, be mounted to a substrate 190 that includes a photosensor 150 of the camera.

Figure 2:
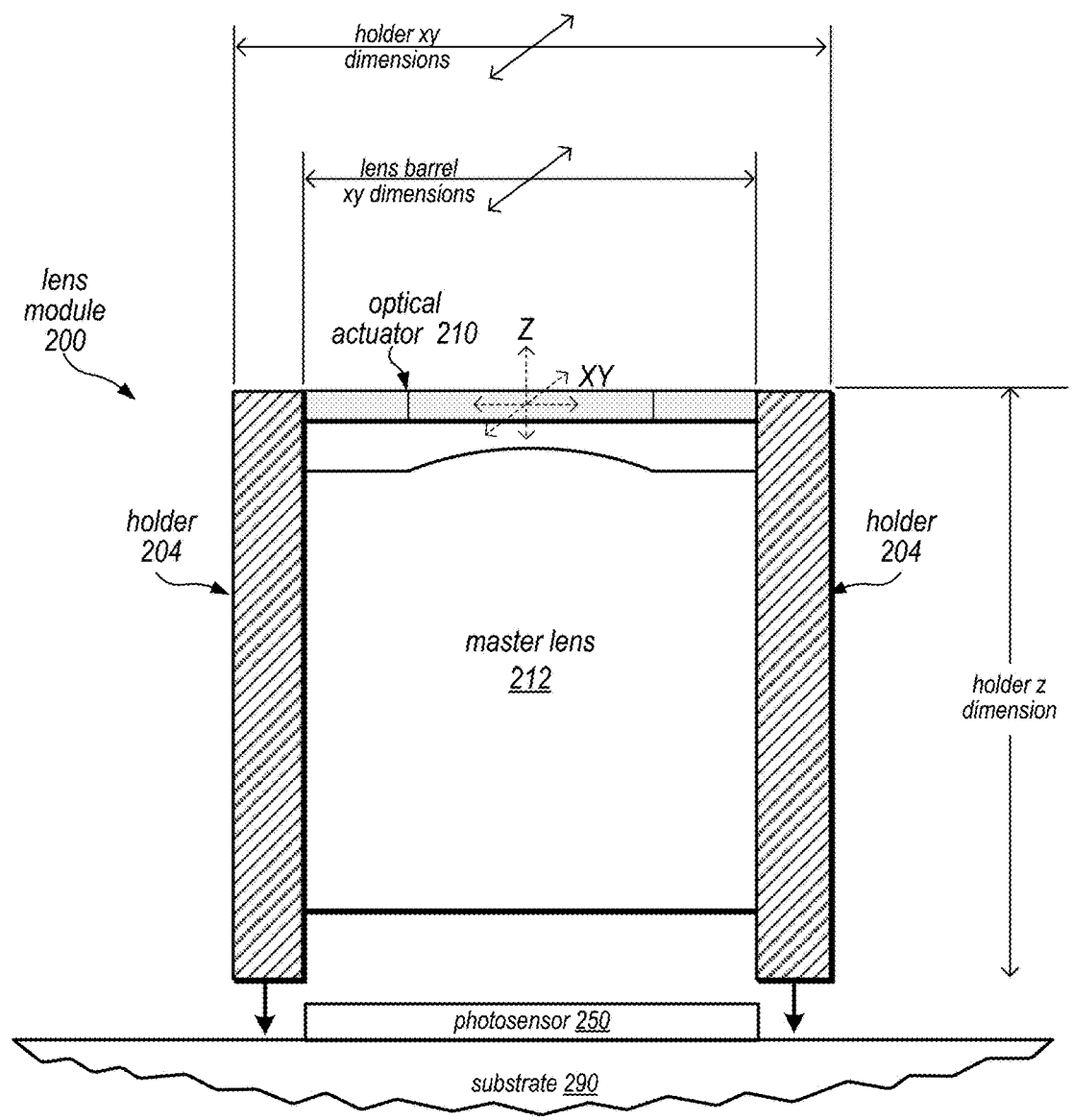
FIG. 2 illustrates a lens module with a fixed master lens and an optical actuator component that provides AF and/or OIS functionality for the camera, according to some embodiments.
Figure 6A:
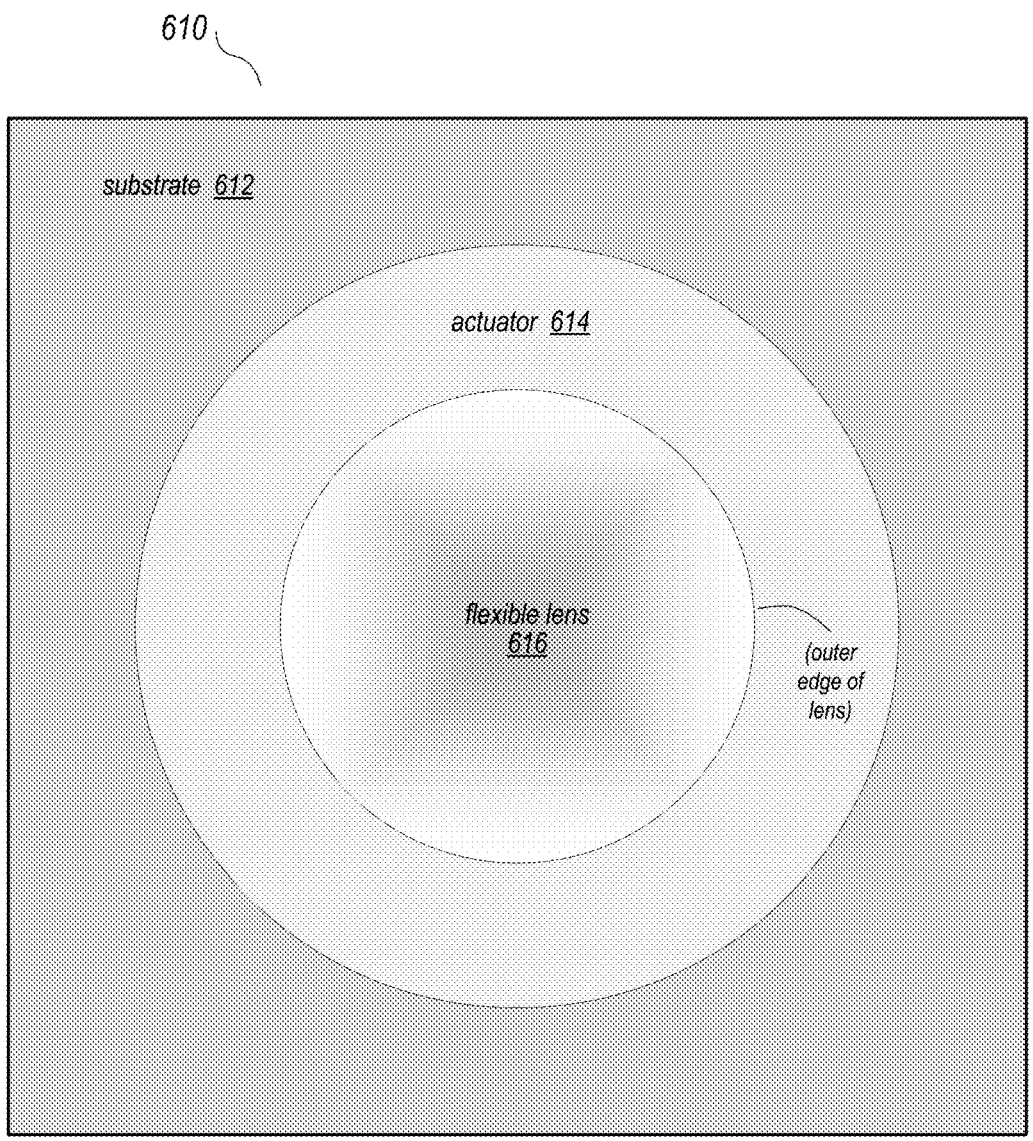
FIGS. 6A and 6B illustrate an example optical actuator component, according to some embodiments.
Figure 6B:
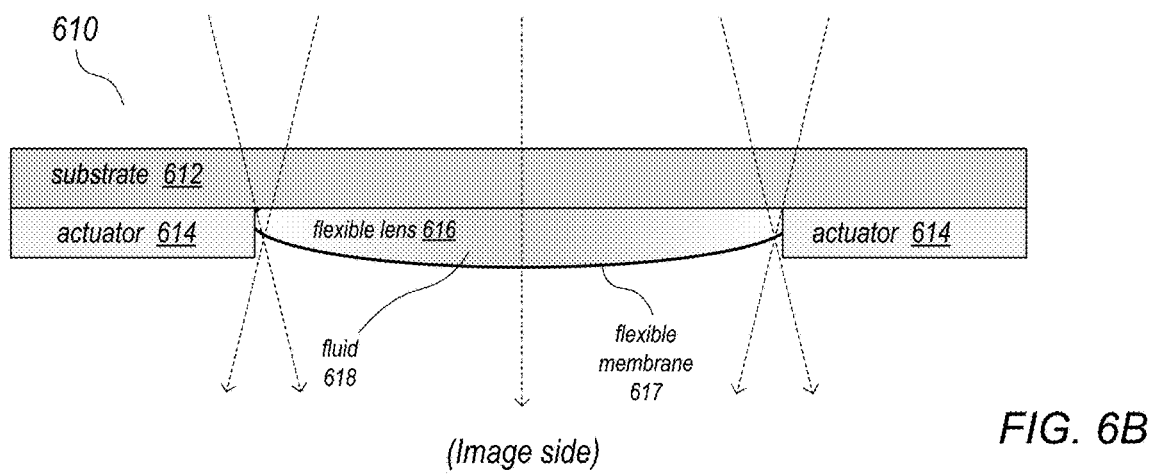

FIG. 2 illustrates a lens module 200 with a fixed master lens and an optical actuator 210 component that provides autofocus (AF) and/or optical image stabilization (OIS) functionality for the camera, according to some embodiments. The lens module 200 may include an optical actuator 210, for example an optical microelectromechanical system (MEMS), and a master lens 212 including one or more refractive lens elements, also referred to as a lens stack. The master lens 212 may be mounted or affixed inside a holder 204; the holder 204 and master lens 212 assembly may collectively be referred to as a lens barrel. The optical actuator 210 may be located on or within the holder 204 on the object side of the master lens 212 in front of a first lens of the stack, while the photosensor 250 is located on the image side of the lens stack when the lens barrel is attached to a substrate 290 that holds the photosensor 250. In some embodiments, the optical actuator 210 may include, but is not limited to, a substrate (e.g., a clear glass or plastic substrate), a flexible optical element (e.g., a flexible lens), and an actuator component that is configured to change the shape of the flexible optical element to provide adaptive optical functionality for the camera without physically moving the lens barrel assembly as is done in the cameras of FIGS. 1A and 1B; the master lens 212 and optical actuator 210 are fixed and stay stationary in the holder 204, and the assembly is fixed to the substrate 290. An example optical actuator that may be used in embodiments is illustrated in FIGS. 6A and 6B. The optical functionality provided by the optical actuator 210 may include autofocus (AF) functionality and/or optical image stabilization (OIS) functionality, for example. The optical actuator 210 may also be referred to as an SSAF (Solid-State Auto-Focus) and/or SSOIS (Solid-State Optical Image Stabilization) component or module. The AF and/or OIS functionality for the camera is provided by the optical actuator 210 changing the shape of the flexible optical element to affect light rays passing from the object field through the flexible optical element to the master lens 212, rather than by physically moving the lens barrel as in conventional AF and/or OIS cameras.

By using an optical actuator 210 that implements SSAF and/or SSOIS technology to provide AF and/or OIS functionality in small form factor cameras as described herein, there is no longer a requirement to physically move the lens barrel with respect to the photosensor 250 as is done in the example camera of FIGS. 1A and 1B to achieve AF and/or OIS functionality. This has a significant impact on the X-Y size of the camera system by reducing the size of the camera in the X-Y dimensions when compared to the camera of FIGS. 1A and 1B.

The addition of the optical actuator 210 that provides SSAF and/or SSOIS functionality to the lens barrel may increase the Z dimension of the lens assembly. However, as the displacement of the lens barrel is no longer required to achieve AF functionality, a much smaller nominal distance between the lens barrel and the camera system cover window can be achieved. This offsets the majority or all of the net increase in the Z dimension due to the addition of the optical actuator 210.

Figure 7A:
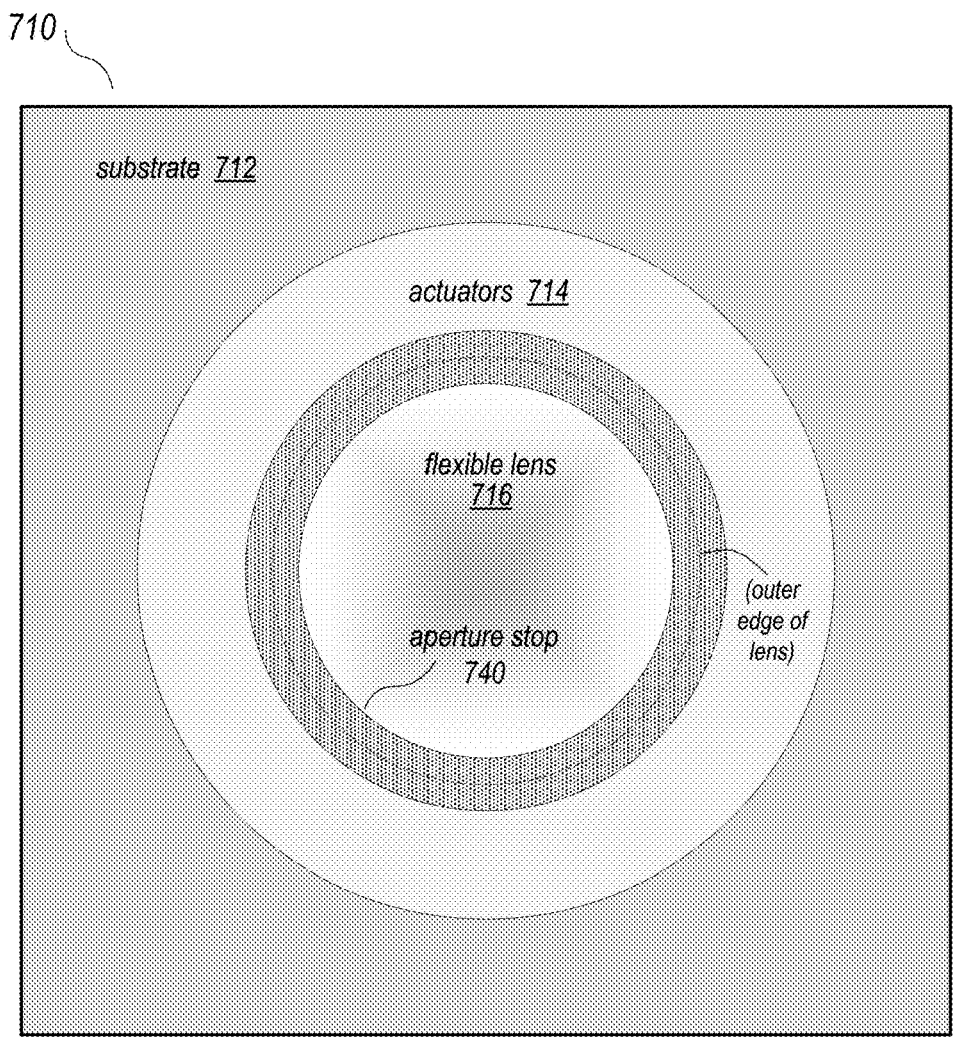
FIGS. 7A and 7B illustrate an example optical actuator component that includes an aperture stop, according to some embodiments.
Figure 7B:
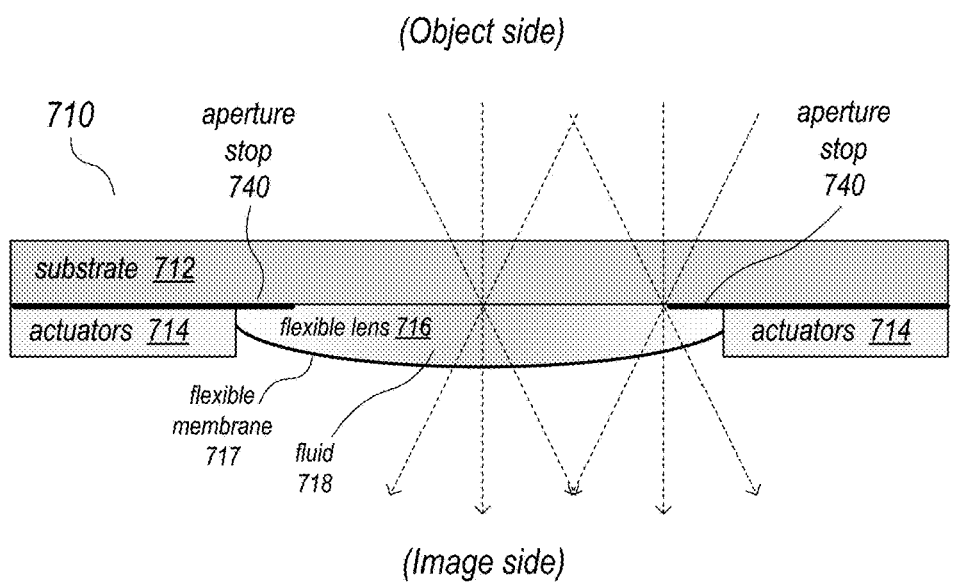

In some embodiments of the lens module 200 as illustrated in FIG. 2, rather than including an aperture stop in the master lens 212, for example at the first lens element in the lens stack, an aperture stop may be included in the optical actuator 210, for example between the substrate and the flexible optical element of the optical actuator 210. An example optical actuator that includes an aperture stop that may be used in embodiments is illustrated in FIGS. 7A and 7B. Including the aperture stop in the optical actuator 210 rather than in the master lens 212 may allow the optical actuator 210 to be smaller in the X-Y dimensions (perpendicular to the optical (Z) axis) than it would be in a similar camera with the aperture stop located in the master lens 212. This may allow the X-Y dimensions of the camera to be reduced when compared to a similar camera with the aperture stop located in the master lens 212. In addition, the smaller optical actuator 210 may be less expensive to manufacture.

Figure 3:
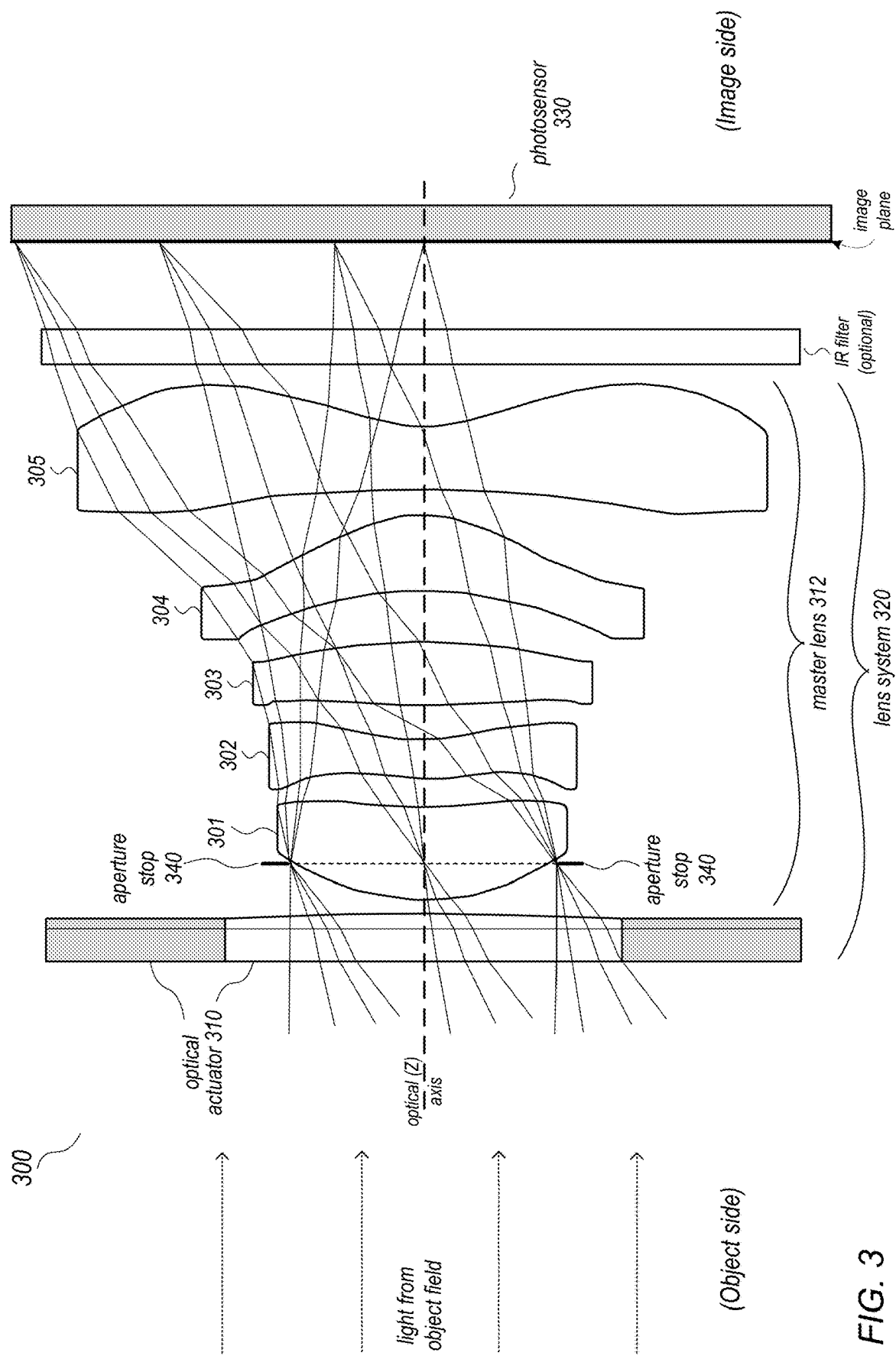
FIG. 3 is a cross-sectional illustration of a camera including a lens system with a fixed master lens and an optical actuator component in which the aperture stop for the camera is located within the lens barrel, according to some embodiments.

FIG. 3 is a cross-sectional illustration of a camera 300 including a lens system 320 with a fixed master lens 312 and an optical actuator 310 component in which the aperture stop 340 for the camera 300 is located within the master lens 312, according to some embodiments. Camera 300 includes at least a lens system 320 and a photosensor 330. The lens system 320 may include a master lens 312 and an optical actuator 310 component, for example an optical microelectromechanical system (MEMS). While not shown in FIG. 3, in some embodiments, the master lens 312 may be fixed within a holder to form a lens barrel; the optical actuator 310 may be attached to or mounted within the object side of the lens barrel. In this example, master lens 312 includes five lens elements 301-305 with refractive power arranged along an optical axis in order from an object side to an image side, and an aperture stop 340 for the camera 300 located at the first lens element 301 of the master lens 312. Note that the aperture stop 340 may be located elsewhere within the master lens 312, for example at or near the front vertex of the first lens element 301 or between the first lens element 301 and the second lens element 302. The camera 300 may also, but does not necessarily, include an infrared (IR) filter located between the lens system 320 and the photosensor 330. The IR filter may, for example, be composed of a glass material. However, other materials may be used. In some embodiments, the IR filter does not have refractive power, and does not affect the effective focal length of the lens system 320. Further note that the camera 300 may also include other components than those illustrated and described herein.

The optical actuator 310 may be located on the object side of the master lens 312 in front of a first lens 301 in the lens stack, while the photosensor 330 is located on the image side of the master lens 312. The optical actuator may 310 include, but is not limited to, a substrate (e.g., a clear glass or plastic substrate), a flexible optical element (e.g., a flexible lens), and an actuator component that is configured to dynamically change the shape of the flexible optical element to provide adaptive optical functionality for the camera 300. An example optical actuator that may be used in camera 300 is illustrated in FIGS. 6A and 6B. The optical functionality provided by the optical actuator 310 may include AF functionality and/or OIS functionality, for example. The optical actuator 310 may also be referred to as an SSAF and/or SSOIS component or module.

Optical characteristics, materials (e.g., plastics or glass), shapes, spacing, and/or sizes of the lens elements in the master lens 312 may be selected to account for the location of the aperture stop 340 within the master lens 312. For example, the X-Y dimensions of one or more of the lens elements 301-305 in the master lens 312 (e.g., the first three lens elements) may be sized according to the location of the aperture stop 340 in the master lens 312 so that the light rays passing through the aperture stop 340 are correctly refracted through the lens elements 301-305 to form an image at an image plane on or proximate to the photosensor 330.

In some embodiments, parameters of the lens elements in the master lens 312 including but not limited to lens shape, size, geometry, position, and materials may be selected at least in part to reduce, compensate, or correct for lens artifacts and effects including one or more of but not limited to vignetting, chromatic aberration, the field curvature or Petzval sum, and lens flare. For example, the lens elements 301-305 may be selected and arranged such that mechanical vignetting is reduced or eliminated.

The lens elements 301-305 of the master lens 312 as shown in FIG. 3 are given by way of example and are not intended to be limiting. More or fewer lens elements (e.g., four or six lens elements) may be used in the master lens 312, and one or more of the lens elements in the master lens 312 may be of different shapes, geometries, sizes, or materials with different optical properties (e.g., refractive index or Abbe number). Spacing between the lens elements in the master lens 312 may be different than shown, and various power orders for the lens elements in the master lens 312 may be used. For example, in the example five lens element master lens 312 of FIG. 3, the power order, from the first lens element to the fifth lens element, may be PNNNP, PNPNP, or some other order, where P indicates a lens with positive refractive power, and N represents a lens with negative refractive power.

Figure 4:
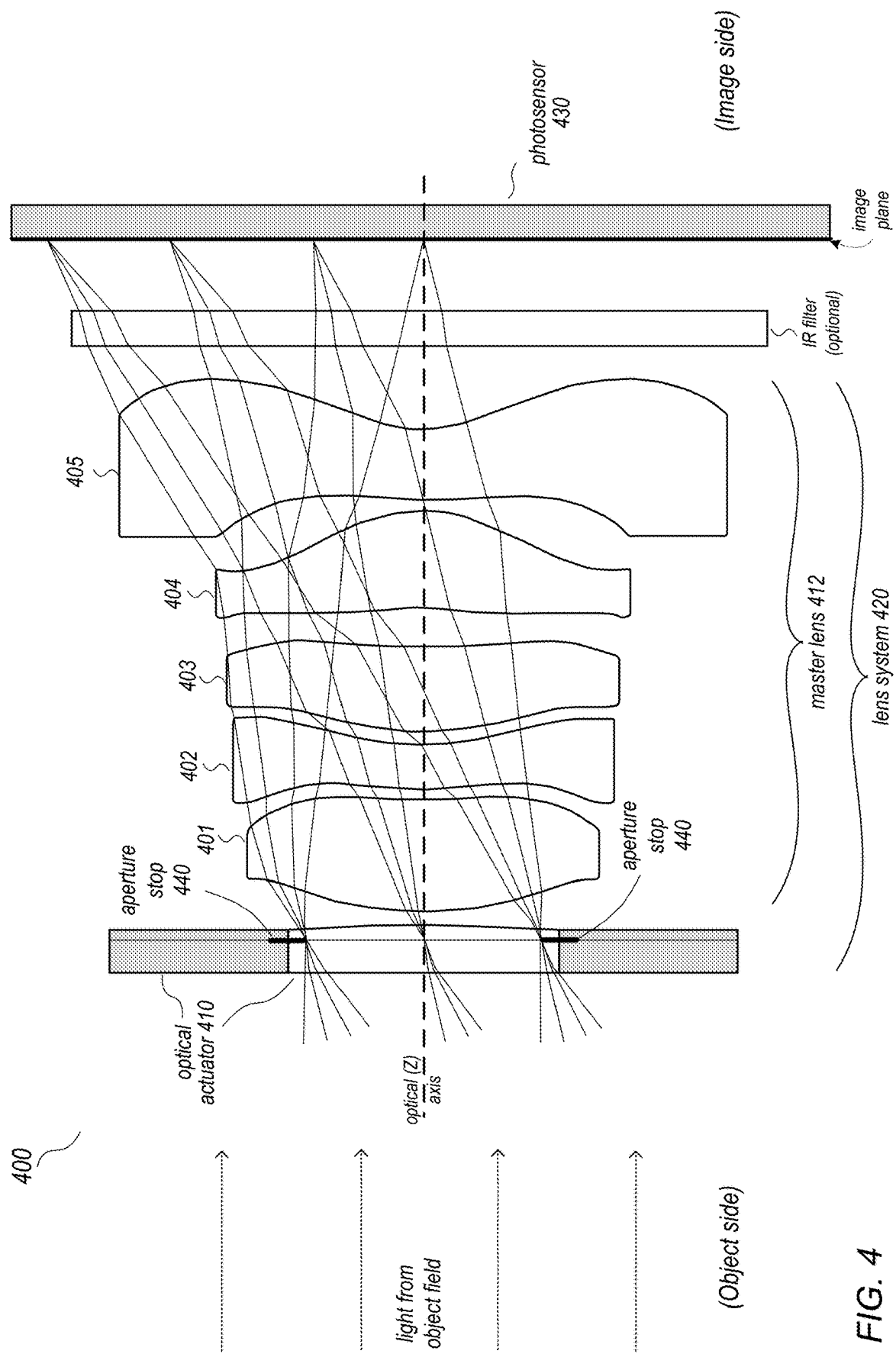
FIG. 4 is a cross-sectional illustration of a camera including a lens system with a fixed master lens and an optical actuator component in which the aperture stop for the camera is located in the optical actuator component, according to some embodiments.

In conventional cameras, an aperture stop for a camera may be included in the lens stack, for example at the first lens element 301 in the master lens 312 as shown in the camera 300 of FIG. 3. FIG. 4 is a cross-sectional illustration of a camera 400 including a lens system 420 with a fixed master lens 412 and an optical actuator 410 component in which the aperture stop 440 for the camera is instead located in the optical actuator 410 component, according to some embodiments. Camera 400 includes at least a lens system 420 and a photosensor 430. The lens system 420 may include a master lens 412 and an optical actuator 410 component, for example an optical MEMS. While not shown in FIG. 4, in some embodiments, the master lens 412 may be fixed within a holder to form a lens barrel; the optical actuator 410 may be located at, attached to, or mounted within the object side of the lens barrel. In this example, master lens 412 includes five lens elements 401-405 with refractive power arranged along an optical axis in order from an object side to an image side. However, instead of an aperture stop located at the first lens element of the master lens as shown in the example camera of FIG. 3, the aperture stop 440 for camera 400 is located at or in the optical actuator 410 component. The camera 400 may also, but does not necessarily, include an infrared (IR) filter located between the lens system 420 and the photosensor 430. The IR filter may, for example, be composed of a glass material. However, other materials may be used. In some embodiments, the IR filter does not have refractive power, and does not affect the effective focal length of the lens system 420. Further note that the camera 400 may also include other components than those illustrated and described herein.

The optical actuator 410 may be located on the object side of the master lens 412 in front of a first lens 401 in the lens stack, while the photosensor 430 is located on the image side of the master lens 412. The optical actuator 410 may include, but is not limited to, a substrate (e.g., a clear glass or plastic substrate), a flexible optical element (e.g., a flexible lens), and an actuator component that is configured to dynamically change the shape of the flexible optical element to provide adaptive optical functionality for the camera 400. An aperture stop 440 may be included in the optical actuator 410, for example between the substrate and the flexible optical element of the optical actuator 410, on the object side surface of the substrate, or embedded within the substrate. An example optical actuator that includes an aperture stop and that may be used in camera 400 is illustrated in FIGS. 7A and 7B. The optical functionality provided by the optical actuator 410 may include AF functionality and/or OIS functionality, for example. The optical actuator 410 may also be referred to as an SSAF and/or SSOIS component or module.

Including the aperture stop 440 in the optical actuator 410 rather than in the master lens 412 may allow the optical actuator 410 to be smaller in the X-Y dimensions (perpendicular to the optical (Z) axis) than it would be in a similar camera with the aperture stop located in the master lens as shown in FIG. 3. This may allow the X-Y dimensions of the camera 400 to be reduced when compared to a similar camera with the aperture stop located in the master lens, and may also allow the X-Y dimensions of a cover window for the camera 400 to be reduced. In addition, the smaller optical actuator 410 of FIG. 4 may be less expensive to manufacture than the larger optical actuator 310 required by the camera 300 of FIG. 3.

Optical characteristics, materials (e.g., plastics or glass), shapes, spacing, and/or sizes of the lens elements in the master lens 412 may be selected to account for location of the aperture stop 440 in the optical actuator 410. For example, the X-Y dimensions of one or more of the lens elements in the master lens 412 (e.g., the first three lens elements 401-403) may be increased according to the location of the aperture stop 440 in the optical actuator 410 so that the light rays passing through the aperture stop 440 are correctly refracted through the lens elements in the master lens 412 to form an image at an image plane on or proximate to the photosensor 430 of the camera 400.

In some embodiments, one or more parameters of the lens elements in the master lens 412 including but not limited to lens shape, size, geometry, position, and materials may be selected at least in part to reduce, compensate, or correct for lens artifacts and effects including one or more of but not limited to vignetting, chromatic aberration, the field curvature or Petzval sum, and lens flare. For example, the lens elements 401-405 may be selected and arranged such that mechanical vignetting is reduced or eliminated given the location and size of the aperture stop 440 in the optical actuator 410. In particular, lens elements 401 and 402, and in some embodiments lens element 403, may be larger in the X-Y dimensions than the respective lens elements in the master lens 312 in camera 300 as shown in FIG. 3 to account for location of the aperture stop 440 in the optical actuator 410. As shown in FIG. 4, the diameter of the lens elements 401, 402, and 403, may be larger than the diameter of the entrance pupil of aperture stop 440 to capture more of the off-angle, oblique rays at the edge of the entrance pupil to thus insure that sufficient light is captured at the edges to reduce or eliminate mechanical vignetting in the lens system 420.

The lens elements 401-405 of the master lens 412 as shown in FIG. 4 are given by way of example and are not intended to be limiting. More or fewer lens elements (e.g., four or six lens elements) may be used in the master lens 412, and one or more of the lens elements in the master lens 412 may be of different shapes, geometries, sizes, or materials with different optical properties (e.g., refractive index or Abbe number). Spacing between the lens elements in the master lens 412 may be different than shown, and various power orders for the lens elements in the master lens 412 may be used. For example, in the example five lens element master lens 412 of FIG. 4, the power order, from the first lens element to the fifth lens element, may be PNNNP, PNPNP, or some other order, where P indicates a lens with positive refractive power, to and N represents a lens with negative refractive power.

Figure 5:
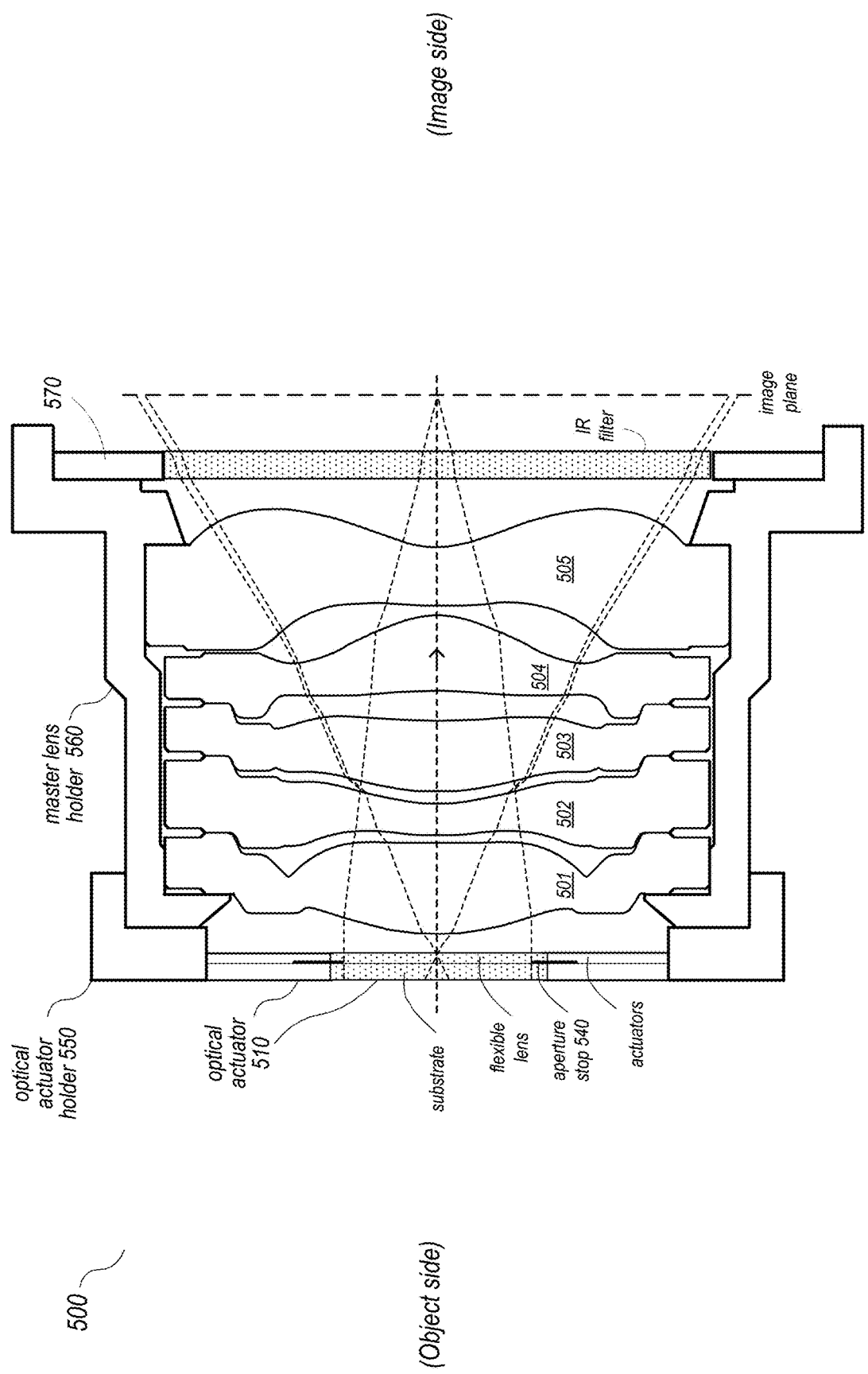
FIG. 5 is a cross-sectional illustration of a camera lens assembly or module that includes an optical actuator component with integrated aperture stop, a fixed master lens, and an optional infrared (IR) filter, according to some embodiments.

FIG. 5 is a cross-sectional illustration of a camera lens assembly or module 500 that includes an optical actuator 510 component with integrated aperture stop 540, a fixed master lens, and an optional infrared (IR) filter, according to some embodiments. The camera lens assembly 500 may include a master lens that includes a stack of five lens elements 501-505 with refractive power arranged along an optical axis in order from an object side to an image side and located within a master lens holder 560 to form a lens barrel. The camera lens assembly 500 may also include an optical actuator 510, for example an optical MEMS, that may include, but is not limited to, a substrate (e.g., a clear glass or plastic substrate), a flexible optical element (e.g., a flexible lens), and an actuator component that is configured to dynamically change the shape of the flexible optical element to provide adaptive optical functionality such as AF and/or OIS functionality. An aperture stop 540 may be included in the optical actuator 510, for example between the substrate and the flexible optical element of the optical actuator 510. An example optical actuator that includes an aperture stop and that may be used in a camera lens assembly 500 is illustrated in FIGS. 7A and 7B. The optical actuator 510 may be mounted within or attached to an optical actuator holder 550 to form an optical actuator assembly. The optical actuator assembly may be mounted or attached to the front (object side) of the lens barrel. The camera lens assembly 500 may also, but does not necessarily, include an IR filter assembly 570 that may be mounted or attached to the rear (image side) of the lens barrel.

Including the aperture stop 540 in the optical actuator 510 rather than in the master lens may allow the optical actuator 510 to be smaller in the X-Y dimensions (perpendicular to the optical (Z) axis) than it would be in a similar camera with the aperture stop located in the master lens. This may allow the X-Y dimensions of the camera lens assembly 500 to be reduced when compared to a similar camera lens assembly with the aperture stop located in the master lens and thus requiring a larger optical actuator, and may also allow the X-Y dimensions of a cover window for the camera lens assembly 500 to be reduced. In addition, the smaller optical actuator 510 may be less expensive to manufacture than a larger optical actuator.

Optical characteristics, materials (e.g., plastics or glass), shapes, spacing, and/or sizes of the lens elements in the lens barrel may be selected to account for location of the aperture stop 540 in the optical actuator 510. For example, the X-Y dimensions of one or more of the lens elements in the master lens (e.g., the first three lens elements 501-503) may be increased according to the location of the aperture stop 540 in the optical actuator 510 so that the light rays passing through the aperture stop 540 are correctly refracted through the lens elements 501-505 in the master lens to form an image at an image plane on or proximate to a photosensor of a camera.

The lens elements 501-505 of the master lens 512 as shown in FIG. 5 are given by way of example and are not intended to be limiting. More or fewer lens elements (e.g., four or six lens elements) may be used in the master lens, and one or more of the lens elements in the master lens may be of different shapes, geometries, sizes, or materials with different optical properties (e.g., refractive index or Abbe number). Spacing between the lens elements in the master lens may be different than shown, and various power orders for the lens elements in the master lens may be used. For example, in the example five lens element master lens of FIG. 5, the power order, from the first lens element to the fifth lens element, may be PNNNP, PNPNP, or some other order, where P indicates a lens with positive refractive power, and N represents a lens with negative refractive power.

FIGS. 6A and 6B illustrate an example optical actuator 610, according to some embodiments. The optical actuator 610 of FIGS. 6A and 6B may, for example, be used in a camera 300 as illustrated in FIG. 3. The optical actuator 610 may include, but is not limited to, a substrate 612 (e.g., a clear glass or plastic substrate), a flexible optical element 616 (e.g., a flexible lens), and an actuator 614 component that is configured to change the shape of the flexible optical element 616 to provide adaptive optical functionality for a camera. The flexible optical element 616 may include a flexible membrane 617 and a fluid (e.g., optical oil) in one or more cavities between the flexible membrane 618 and the surface of the substrate 612. For example, to change the shape of the flexible optical element 616, the actuator 614 component may add or remove fluid 618 from the cavity(s). The optical functionality provided by the optical actuator 610 may include autofocus (AF) functionality and/or optical image stabilization (OIS) functionality, for example. While FIG. 6B shows the flexible optical element 616 with a curved membrane 617, in some embodiments the flexible optical element 616 may be made substantially flat to focus at infinity. While FIG. 6B shows the substrate 612 as rectangular or square, the substrate 612 may be other shapes, for example round.

FIGS. 7A and 7B illustrate an example optical actuator component that includes an aperture stop, according to some embodiments. The optical actuator 710 of FIGS. 7A and 7B may, for example, be used in a camera 400 as illustrated in FIG. 4 or camera lens assembly 500 as illustrated in FIG. 5. The optical actuator 710 may include, but is not limited to, a substrate 712 (e.g., a clear glass or plastic substrate), a flexible optical element 716 (e.g., a flexible lens), and an actuator 714 component that is configured to change the shape of the flexible optical element 716 to provide adaptive optical functionality for a camera. The flexible optical element 716 may include a flexible membrane 717 and a fluid (e.g., optical oil) in one or more cavities between the flexible membrane 718 and the surface of the substrate 712. For example, to change the shape of the flexible optical element 716, the actuator 714 component may add or remove fluid 718 from the cavity(s). The optical functionality provided by the optical actuator 710 may include autofocus (AF) functionality and/or optical image stabilization (OIS) functionality, for example. While FIG. 7B shows the flexible optical element 716 with a curved membrane 717, in some embodiments the flexible optical element 716 may be made substantially flat to focus at infinity. While FIG. 7B shows the substrate 712 as rectangular or square, the substrate 712 may be other shapes, for example round.

An aperture stop 740 may be included in the optical actuator 710, for example between the substrate 712 and the flexible optical element 716 of the optical actuator 710. Including the aperture stop 740 in the optical actuator 710 rather than in the master lens of the camera may allow the optical actuator 710 to be smaller in the X-Y dimensions (perpendicular to the optical (Z) axis) than the optical actuator 610 shown in FIGS. 6A and 6B. This may allow the X-Y dimensions of the camera lens assembly and the camera to be reduced when compared to a camera lens assembly and camera that uses the optical actuator 610 as illustrated in FIGS. 6A and 6B, and may also allow the X-Y dimensions of a cover window for the camera lens assembly to be reduced. In addition, the smaller optical actuator 710 of FIGS. 7A and 7B may be less expensive to manufacture than the larger optical actuator 610 shown in FIGS. 6A and 6B.

The aperture stop 740 may be included in the optical actuator 710 in any of various ways, and at other locations than between the substrate 712 and the flexible optical element 716. For example, the aperture stop 740 may be located on the object side of the substrate 712, or within the substrate (for example, between two panes of glass). The aperture stop may, for example, be an opaque substance applied to the image or object side surface of the substrate 712, or a thin membrane or sheet of opaque material attached to the image or object side surface of the substrate 712, or between two panes of glass of the substrate 712.

Figure 8:
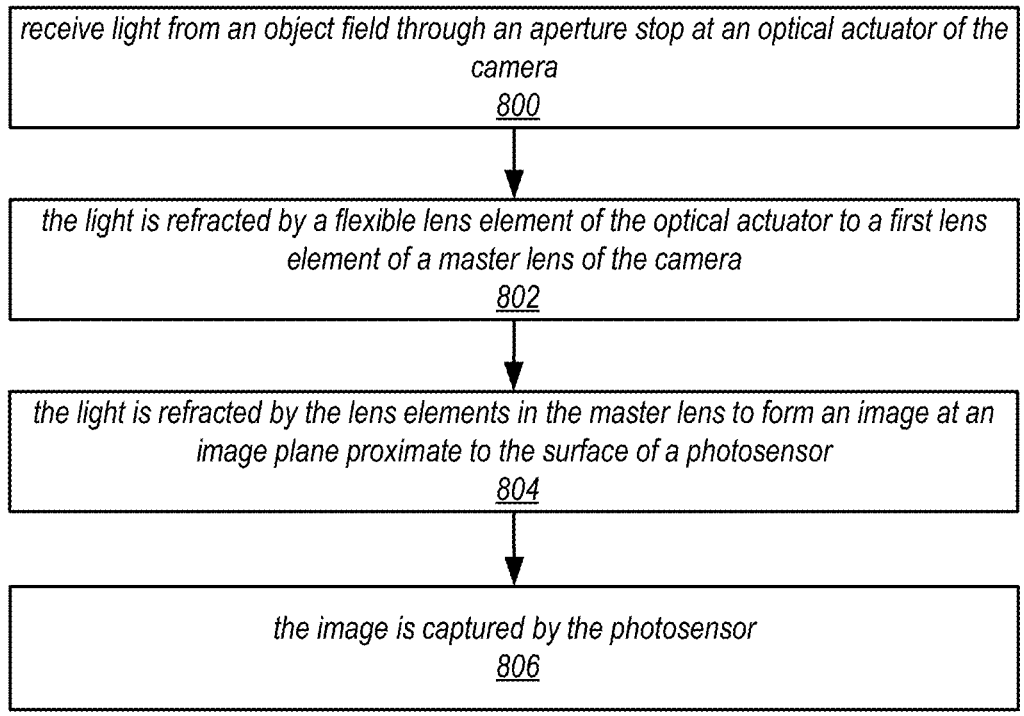
FIG. 8 is a flowchart of a method for capturing images using a camera as illustrated in FIG. 4, according to some embodiments.

FIG. 8 is a high-level flowchart of a method for capturing images using a camera as illustrated in FIG. 4, according to some embodiments. As indicated at 800, light from an object field in front of the camera is received at an optical actuator of the camera and passes through an aperture stop of the optical actuator to a flexible optical element of the optical actuator. FIGS. 7A and 7B illustrate an example optical actuator that may be used. As indicated at 802, the light is refracted by the flexible optical element of the optical actuator to a first lens element of a master lens of the camera. The master lens may include multiple (e.g., five) lens elements arranged along an optical axis of the camera from the first lens element to a last lens element. FIGS. 4 and 5 show examples of master lenses that may be used. The shape of the flexible optical element may be dynamically changed by the optical actuator to provide AF and/or OIS functionality for the camera. As indicated at 804, the light is refracted by the lens elements in the master lens to form an image at an image plane at or near the surface of a photosensor of the camera. As indicated at 806, the image is captured by the photosensor. While not shown, in some embodiments, the light may pass through an infrared filter that may for example be located between the last lens element in the master lens and the photosensor.

Figure 9A:
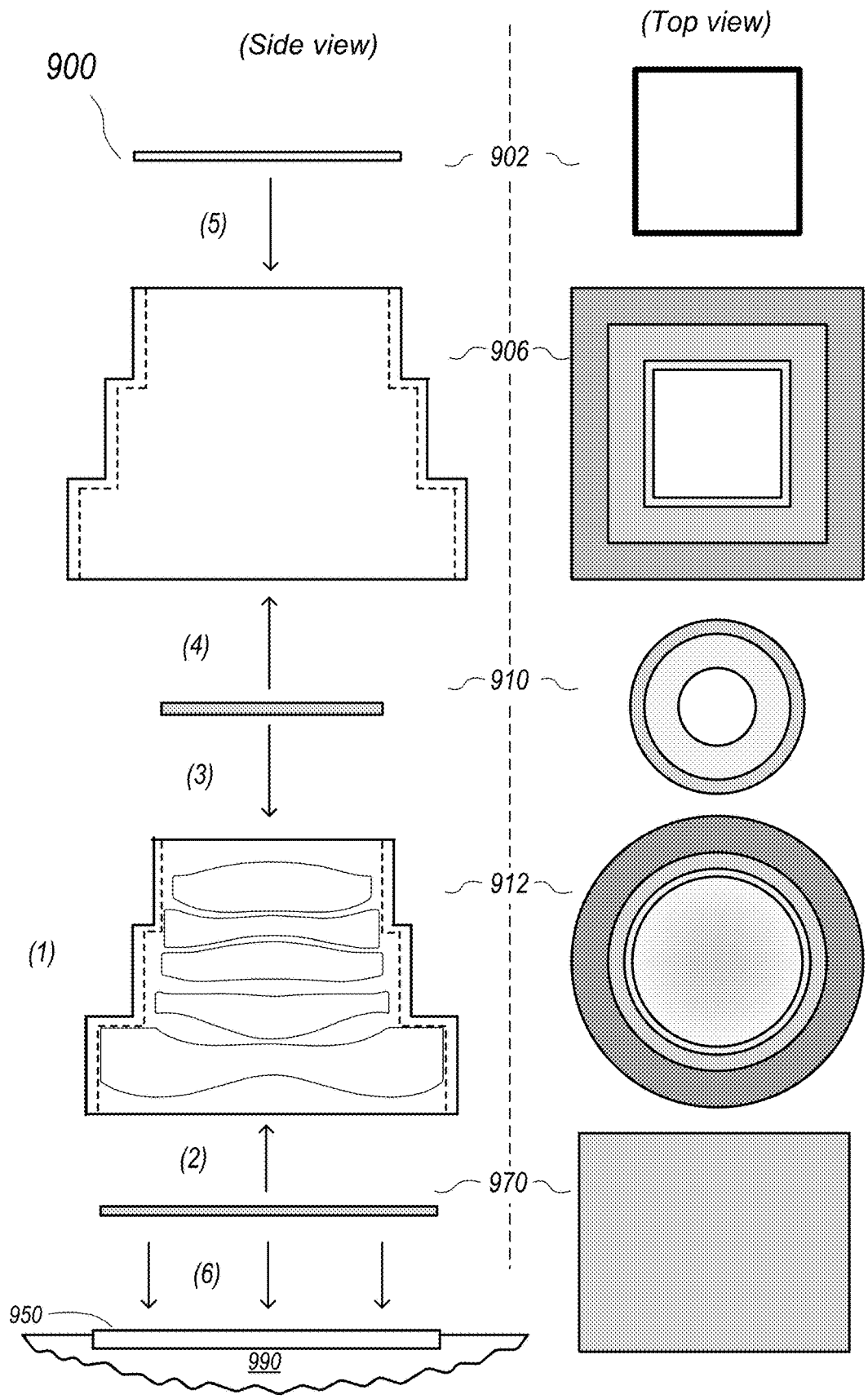
FIG. 9A shows components of an example small form factor camera that includes a camera lens assembly as illustrated in FIG. 5 and illustrates a method for assembling the camera, according to some embodiments.

FIG. 9 shows components of an example small form factor camera that includes a camera lens assembly as illustrated in FIG. 5 and illustrates a method for assembling the camera, according to some embodiments. FIG. 9 shows side and top views of components of the camera 900. In some embodiments, a small form factor camera 900 may include, but is not limited to, a lens barrel 912 including a stack of lenses that form a master lens for the camera 900, an optical actuator 910 that, for example, provides optical AF and/or OIS functionality for the camera 900, an IR filter assembly 970, a photosensor 950 mounted to a substrate 990 in a device, an outer cover 906 for the camera lens assembly 906, and a cover window 902 for the camera 900. In some embodiments, to assemble the camera 900, the lens elements are inserted into a lens stack holder to assemble the lens barrel 912 (1), the IR filter assembly 970 and optical actuator 910 components are attached to the lens barrel 912 to form the camera lens assembly ((2) and (3)), the camera lens assembly is inserted in the outer cover 906 (4), the cover window 902 is attached to the outer cover 906 (5), and the assembled camera body is then attached to the substrate 990 over the photosensor 950 (6).

Note that the order of the assembly steps (1) through (6) is not intended to be limiting. For example, the components may be assembled in other orders. Also, there may be more or fewer components, and there may be more or fewer steps in the assembly process. For example, steps (2) and (3) may be reversed, or may be performed substantially simultaneously. As another example, the camera lens assembly may be attached to the substrate 990 before the cover 906 is installed.

In some embodiments, at least some of the components of the camera 900 may be manufactured and/or assembled by different entities (e.g., vendors for the different components) at different locations, and mounting the assembly to the substrate 990 may be performed by an entity at a facility that assembles a device (e.g., a mobile device) that includes the small form factor camera 900. For example, the lens barrel 912 may be assembled at one facility, the optical actuator 910 may be assembled at another facility, and the components may be assembled to form the camera 900 at yet another facility.

The entity that assembles the lens barrel 912 typically tests the lens stack in the barrel 912 once assembled to insure the optical characteristics and quality of the master lens meets specifications. However, to test the optical characteristics and quality of a camera lens, an aperture stop is required. Since the aperture stop is included in the optical actuator 910 and not in the lens stack and the optical actuator 910 is not available, an optical actuator simulator device that matches the characteristics of the optical actuator 910 (e.g., diameter and distance from the first lens of the lens stack in the lens barrel, optical power of the lens element of the optical actuator 910, if any) may be used to test the assembled lens barrel 912. In some embodiments, the optical actuator 910 may have zero (0) optical power when focused at infinity, which would simplify the testing of the assembled lens barrel 912 with the optical actuator simulator.

The entity that manufactures and/or assembles the optical actuator 910 typically tests optical actuator 910 to insure that the optical actuator 910 is compatible with the master lens. For example, a wavefront analysis machine or the like may be used to test the optical actuator.

In some embodiments, at step (6), during the process of attaching the assembled camera body to the substrate 990 over the photosensor 950, a technique (e.g., an active alignment process) may be used to insure that the alignment and relative position of the camera lens assembly to the photosensor 950 in the X, Y, and/or Z dimensions is correct according to specifications and within tolerances of the camera, and to maximize camera system performance and yield. In some embodiments, the active alignment process involves setting the optical actuator 910 to its nominal infinity voltage (e.g., 20C voltage), doing Z alignment of the photosensor 950 to find optimal focus, and then performing X and Y tilt of the image plane to find optimal field performance. In some embodiments, an additional step can be performed during the active alignment process to optimize the optical actuator 910 voltage to ensure that the image field curvature is as flat as possible for the infinity 20C case. In some embodiments, the completed system may be tested, for example using one or more spatial frequency response (SFR) techniques.

Figure 9B:
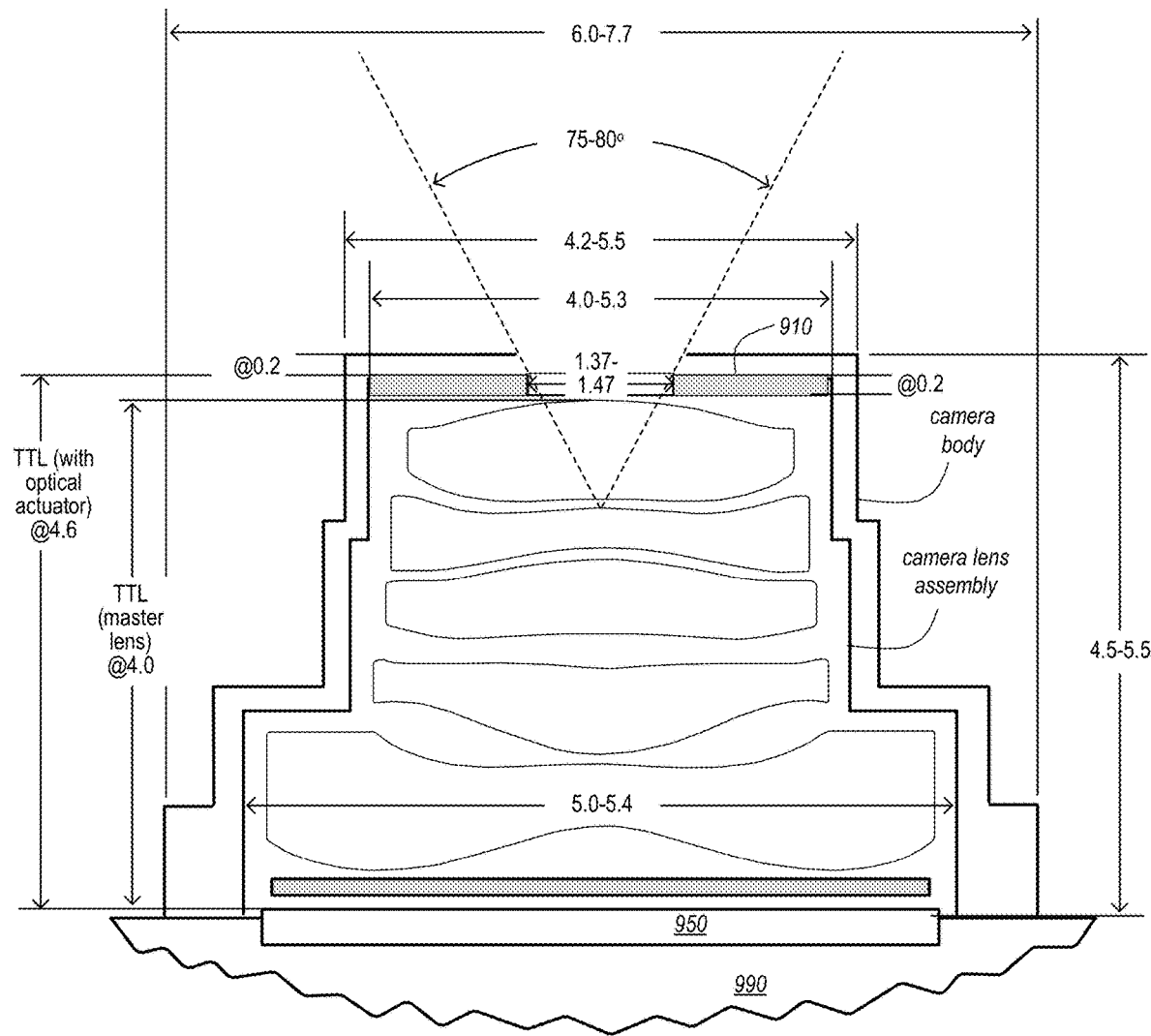
FIG. 9B shows an example small form factor camera that includes a camera lens assembly as illustrated in FIG. 5 and provides example dimensions and optical characteristics for the camera, according to some embodiments.

FIG. 9B shows an example small form factor camera that includes a camera lens assembly as illustrated in FIG. 5 and provides example dimensions and optical characteristics for the camera, according to some embodiments. The measurements are given in millimeters (mm). The measurements and optical characteristics are not intended to be limiting.

As shown in the example camera of FIG. 9B, the optical actuator 910 may be @0.2 mm thick. X-Y dimensions of the camera lens assembly may be within a range of 4.9-5.4 mm. X-Y dimensions of the camera body may be within a range of 5.4-7.7 mm. Z (height) dimension of the camera body may be within a range of 4.5-5.5 mm. Thickness of the cover window may be @0.2 mm. Thickness of the optical actuator 910 may be @0.2 mm, for example within a range of 1.9 to 2.1 mm. X-Y dimensions of the optical actuator 910 may be within a range of 3.5-5.0 mm. The angle through the entrance pupil (the aperture stop in the optical actuator 910) with vertex at the front vertex of the first lens in the master lens may be 75-80°, for example 77°. The diameter of the entrance pupil (D) of the aperture stop 910 may be within a range of 1.37 to 1.47 mm, for example 1.42 mm. Total track length (TTL) of the master lens may be @4.0; TTL including the optical actuator 910 may be @4.6. Note that the TTL of the master lens and/or master lens with optical actuator may be shorter or longer than the example TTLs that are given; for example, TTL of the master lens may be within a range of 3.5-4.5 mm (e.g., 4.0 mm), and TTL of the master lens with optical actuator may be within a range of 3.9-5.1 mm (e.g., 4.6 mm). The lens system of the example camera 900 may have paraxial focal length ($f$) of @2.8 (e.g., within a range of 2.8 to 2.9 mm, e.g., 2.85), and an f-number (focal ratio) of @2.0 (e.g., within a range of 1.9-2.1). The f-number or focal ratio of a lens system is the ratio ($f$/D) of the lens system's focal length ($f$) to the diameter of the entrance pupil (D) of the aperture stop. Telephoto ratio (TTL/$f$) of the example camera 900 is @2.3. Note that the lens elements in the lens system may be selected to provide other f-numbers and/or telephoto ratios, for example various f-numbers within the range 1.8-10.0, and/or telephoto ratios lower or higher than 2.3, including telephoto ratios that are less than or equal to 1.0.

Example Computing Device

Figure 10:
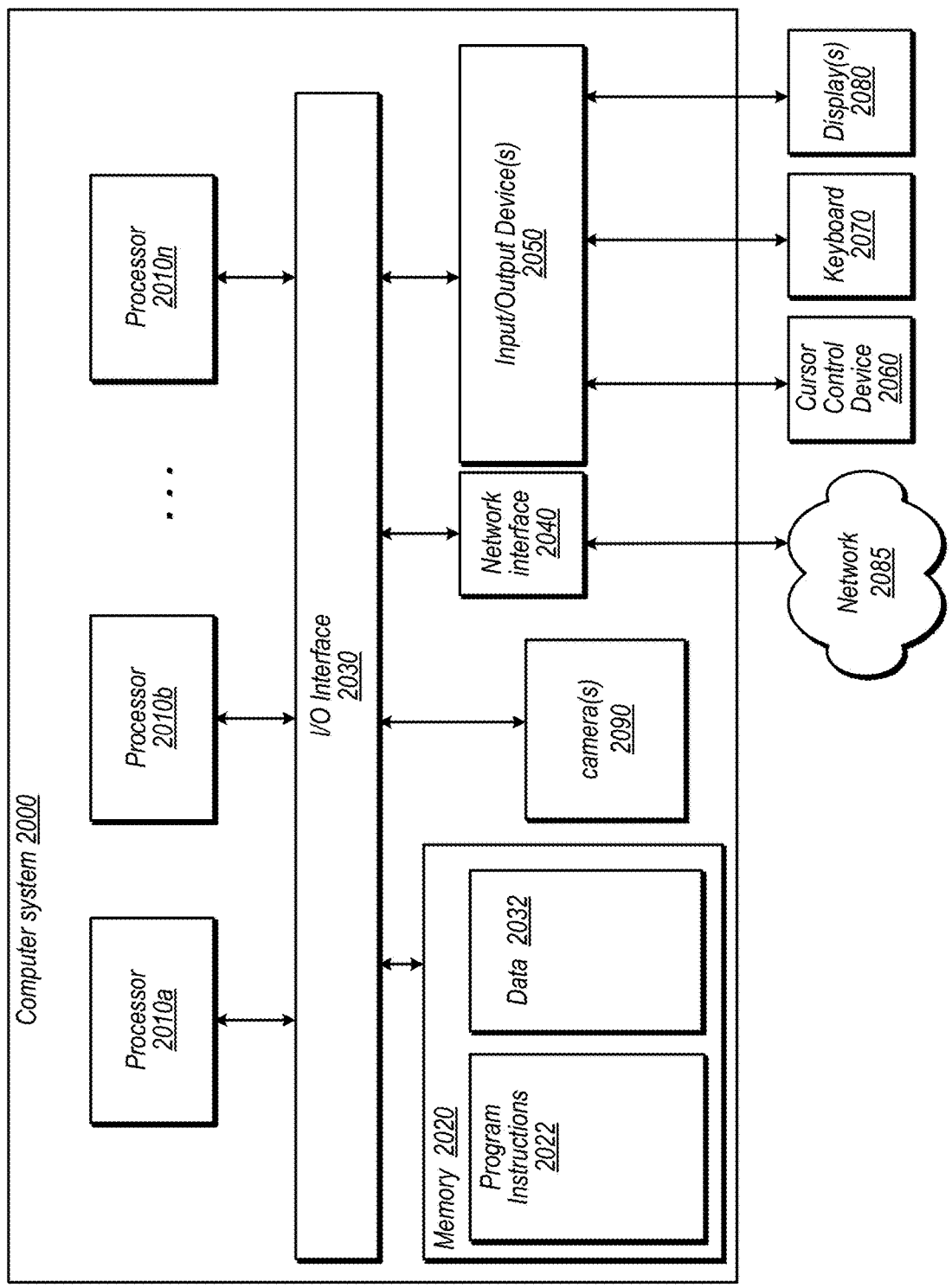
FIG. 10 illustrates an example computer system that may be used in embodiments.

FIG. 10 illustrates an example computing device, referred to as computer system 2000, that may include or host embodiments of the camera as illustrated in FIGS. 2 through 9B. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 2 through 9B, which may also be coupled to I/O interface 2030, or one or more cameras as described above with respect to FIGS. 2 through 9B along with one or more other cameras such as wide-field and/or telephoto cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
   a master lens comprising a plurality of refractive lens elements arranged along an optical axis of the lens system; and
   an optical actuator located on the optical axis of the lens system on an object side of the master lens and configured to provide one or more optical functionalities for a camera without moving the master lens, wherein the optical functionalities include one or more of autofocus or optical image stabilization;
   wherein the optical actuator includes an aperture stop for the lens system and a flexible optical element, and wherein all fixed lens elements in the lens system are located on an image side of the optical actuator.

2. The lens system as recited in claim 1, wherein the optical actuator further comprises:
   a substrate at least partially composed of a clear material;
   the aperture stop;
   the flexible optical element, which is attached to the substrate; and
   one or more actuator components configured to change a shape of the flexible optical element to provide the one or more optical functionalities for the camera.

3. The lens system as recited in claim 2, wherein the flexible optical element is attached to an image side surface of the substrate and is substantially centered on the optical axis of the lens system.

4. The lens system as recited in claim 2, wherein the flexible optical element is located between the substrate and the flexible optical element.

5. The lens system as recited in claim 2, wherein the aperture stop is located on an image side surface of the substrate, on the object side surface of the substrate, or within the substrate, and wherein the aperture stop comprises an opaque substance or a sheet of opaque material.

6. The lens system as recited in claim 2, wherein the flexible optical element includes a flexible lens comprising a flexible membrane and a fluid-filled cavity, wherein the one or more actuator components add fluid to or remove fluid from the cavity to change the shape of the flexible lens.

7. The lens system as recited in claim 1, wherein the master lens includes five lens elements with refractive power.

8. The lens system as recited in claim 1, wherein diameter of an entrance pupil of the aperture stop is within a range of 1.37 millimeters to 1.47 millimeters.

9. The lens system as recited in claim 1, wherein X-Y dimensions of the optical actuator are within a range of 3.5 millimeters to 5.0 millimeters, and wherein thickness on the optical axis of the optical actuator is within a range of 1.9 to 2.1 mm.

10. The lens system as recited in claim 1, wherein total track length of the lens system is within a range of 3.9 millimeters to 5.1 millimeters.

11. The lens system as recited in claim 1, wherein focal length $f$ of the lens system is within a range of 2.8 millimeters to 2.9 millimeters.

12. The lens system as recited in claim 1, wherein focal ratio of the lens system is within a range of 1.9 to 2.1 millimeters.

13. The lens system as recited in claim 1, wherein diameters of a first, second, and third lens elements on the object side of the master lens are larger than diameter of an entrance pupil of the aperture stop to reduce or eliminate mechanical vignetting in the lens system.

14. A camera, comprising:
 a photosensor configured to capture light projected onto a surface of the photosensor; and
 a lens system configured to refract light from an object field located in front of the camera to form an image of a scene at an image plane at or near the surface of the photosensor, wherein the lens system comprises:
  a master lens comprising a plurality of refractive lens elements arranged along an optical axis of the camera, wherein the master lens is fixed within a body of the camera; and
  an optical actuator located on the optical axis of the camera on an object side of the master lens and configured to provide one or more optical functionalities for a camera without moving the master lens, wherein the optical functionalities include one or more of autofocus or optical image stabilization, wherein the optical actuator includes an aperture stop for the camera and a flexible optical element, and wherein all fixed lens elements in the lens system are located on an image side of the optical actuator.

15. The camera as recited in claim 14, further comprising an infrared filter located between the master lens and the photosensor.

16. The camera as recited in claim 14, wherein the optical actuator further comprises:
 a substrate composed of a clear material;
 the aperture stop;
 the flexible optical element, which is attached to the substrate; and
 one or more actuator components configured to change a shape of the flexible optical element to provide the one or more optical functionalities for the camera.

17. The camera as recited in claim 16, wherein the aperture stop is located on a surface of the substrate and between the substrate and the flexible optical element.

18. The camera as recited in claim 14, wherein total track length of the camera is within a range of 3.9 millimeters to 5.1 millimeters, diameter of an entrance pupil of the aperture stop is within a range of 1.37 millimeters to 1.47 millimeters, focal length $\eta$ of the camera is within a range of 2.8 millimeters to 2.9 millimeters, and focal ratio of the camera within a range of 1.9 to 2.1 millimeters.

19. A device, comprising:
 one or more processors;
 one or more cameras; and
 a memory comprising program instructions executable by at least one of the one or more processors to control operations of the one or more cameras;
 wherein at least one of the one or more cameras is a camera comprising:
  a photosensor configured to capture light projected onto a surface of the photosensor; and
  a lens system configured to refract light from an object field located in front of the camera to form an image of a scene at an image plane at or near the surface of the photosensor, wherein the lens system comprises:
   a master lens comprising a plurality of refractive lens elements arranged along an optical axis of the camera, wherein the master lens is fixed within a body of the camera; and
   an optical actuator located on the optical axis of the camera on an object side of the master lens and configured to provide one or more optical functionalities for a camera without moving the master lens, wherein the optical functionalities include one or more of autofocus or optical image stabilization, wherein the optical actuator includes an aperture stop for the camera and a flexible optical element, and wherein all fixed lens elements in the lens system are located on an image side of the optical actuator.

20. The device as recited in claim 19, wherein the optical actuator further comprises:
 a substrate composed of a clear material;
 the aperture stop;
 the flexible optical element, which is attached to the substrate; and
 one or more actuator components configured to change a shape of the flexible optical element to provide the one or more optical functionalities for the camera;
 wherein the aperture stop is located on a surface of the substrate and between the substrate and the flexible optical element.

* * * * *